Sept. 1, 1964

M. J. HOUDOU 3,146,976

PARACHUTE

Filed Oct. 18, 1962

INVENTOR.
Maurice J. Houdou
BY
ATTORNEY

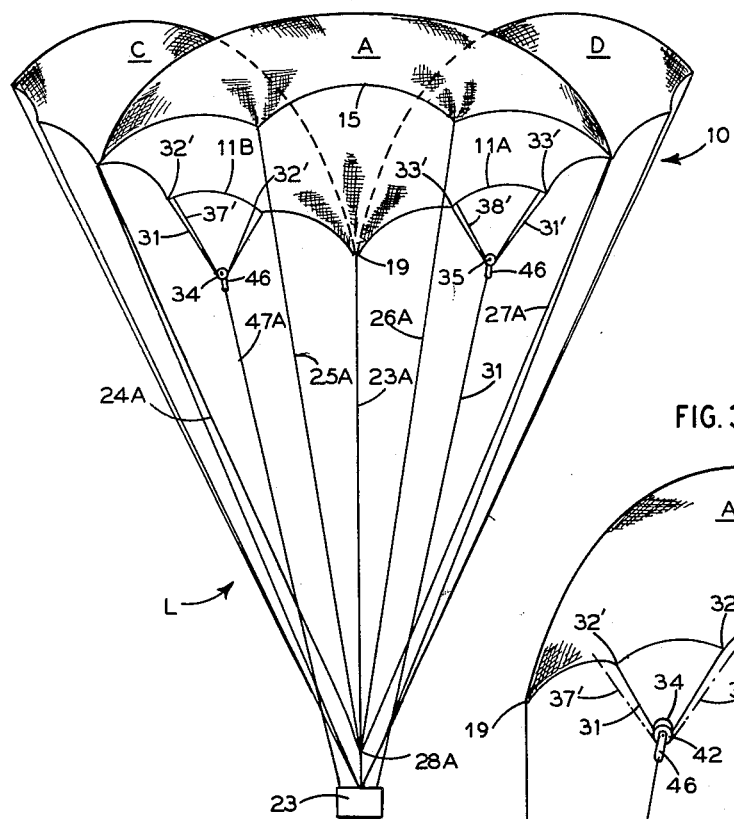
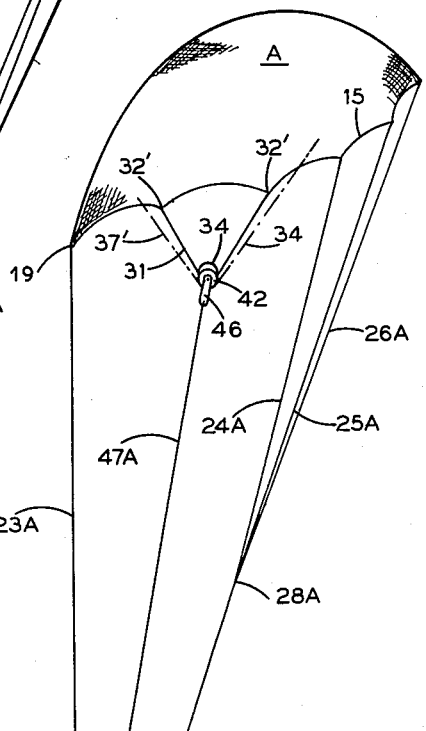
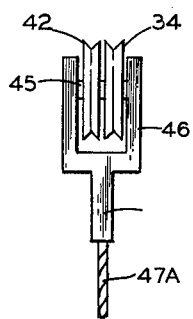

Sept. 1, 1964   M. J. HOUDOU   3,146,976
PARACHUTE

Filed Oct. 18, 1962   3 Sheets-Sheet 3

INVENTOR.
Maurice J. Houdou
BY
*Irving Seidman*
ATTORNEY

United States Patent Office 3,146,976
Patented Sept. 1, 1964

3,146,976
PARACHUTE
Maurice J. Houdou, 971 W. Park Ave., Long Beach, N.Y.
Filed Oct. 18, 1962, Ser. No. 231,423
13 Claims. (Cl. 244—152)

This invention relates to parachutes; and more particularly relates to parachutes which may be regulated by remote control to direct the same during its fall.

A free falling parachute carrying cargo or the like cannot be regulated during its fall to direct the same and the spotting of the parachute depends on a combination of variable factors including skill of the plane pilot in determining the point of release in relation to the target and wind conditions.

Accordingly, a principal object of this invention is to provide an improved parachute construction which permits regulation of its movements during the drop by remote control means whereby the spotting of the parachute on a predetermined target may be achieved with maximum efficiency.

Another object of this invention is to provide an improved parachute construction which lends itself to regulation so that sensitive cargo carried by the parachute will be substantially free from damage or other adverse effects due to abrupt stresses imposed by the parachute movements.

Yet another object of this invention is to provide an improved parachute construction comprising multiple sections subject to independent and coordinated manipulation during the drop to regulate rate and direction of movement thereof.

Still another object of this invention is to provide an improved parachute construction which may be manipulated in a manner to close or partially close the parachute to effect a braking action during fall or to reduce dragging after the parachute reaches its objective.

Other objects of this invention will in part be obvious and in part hereinafter pointed out.

In the drawings,

FIG. 2 is a side elevational view thereof showing the component parachute sections thereof in a predetermined tilted relation to each other;

FIG. 3 is a side elevational view showing a single parachute section tilted by a single motor;

FIG. 10 is a side elevational view showing a pair of balancing pulleys on a single bracket.

The parachute construction of the instant invention comprises a plurality of individual fabric parachute sections arranged for independent or coordinated tilted movements between completely open and completely closed positions, whereby the direction, rate and mode of movement of the parachute during its fall may be regulated and braked; such regulation being feasible from a remote point, as when the parachute is carrying cargo; or immediately when the parachute is of the personnel type.

Figure 1:
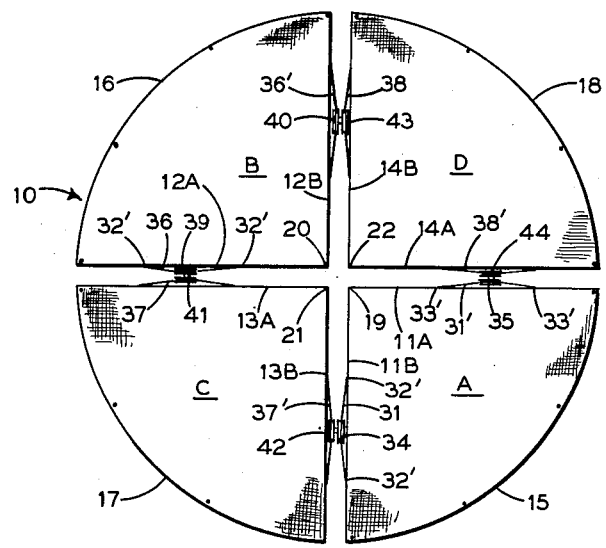
FIG. 1 is a top plan view of a parachute construction embodying the invention.

Thus, as shown in FIGS. 1 and 2, 10 designates a parachute embodying the invention. The same comprises a plurality of similar sections, quadrant shaped, fabric A, B, C and D, for the purpose of illustration. As indicated in FIG. 1, the sections A, B, C and D, respectively comprise rectilinear side edges 11A, 11B; 12A, 12B; 13A, 13B; and 14A, 14B; arcuate base edges 15, 16, 17, 18 and apex portions 19, 20, 21 and 22.

A base member 23 is suspended below the parachute sections A, B, C and D by shroud lines generally indicated at L. Cargo G, in turn is secured to base member 23. Thus, as shown in FIG. 3, section A has a single shroud cord portion 23A extending downwardly from apex portion 19 thereof and a multicord portion 24A, 25A, 26A and 27A extending downwardly from circumferentially spaced points on the arcuate base edge 15 thereof. The lower ends of multicords 24A, 25A, 26A and 27A are collected together as at 28A and connected as a single line to the end of the single cord 23A.

The thus interconnected cords have their bight portion entrained around a pulley 29A on a reversible electric motor 30A mounted on base member 23. It will be apparent that upon rotation of pulley 29A in a counterclockwise direction (FIG. 3), apex portion 19 of parachute section A will be pulled down while the arcuate base edge 15 thereof will rise. On rotation of motor 30A in the clockwise direction the tilted movements of apex portion 19 and base portion 15 will be reversed.

Figure 9:
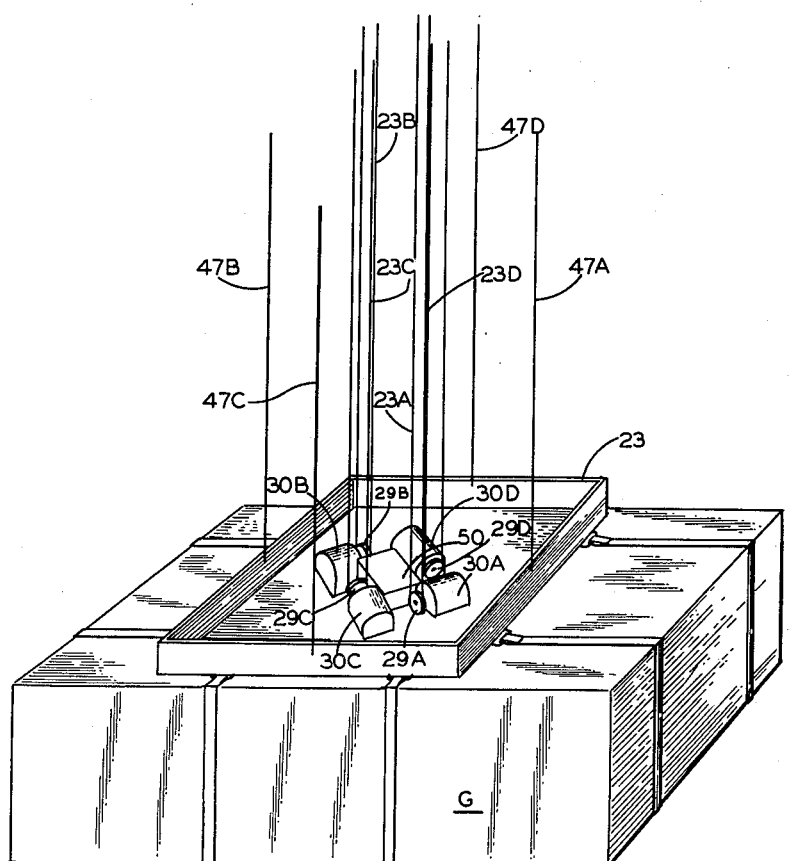
FIG. 9 is a perspective view showing a base member suspended from the parachute sections and from which cargo may be suspended; and which carries the means for controlling the tilted movements of the several parachute sections.

As indicated in FIG. 9, motors 30B, 30C and 30D are provided on base member 23 with pulleys 29B, 29C and 29D for respectively entraining the apex cords 23B, 23C, 23D of sections B, C and D respectively which are connected respectively to multicords similar to multicords 24A, 25A, 26A and 27A, on said sections B, C and D. Battery means, not shown is provided on base member 23 for energizing motors 30A–30C. Thus, parachute sections B, C and D respectively may be tilted and manipulated as described in connection with section A supra.

During the tilted movements of the section A, side edges 11A, 11B thereof are maintained in extended relation. To this end, a pair of balancing cords 31, 31' have their opposite ends secured to spaced points 32' and 33' on edges 11A, 11B respectively of section A; such points being intermediate the juncture of edges 11A, 11B and base edge 15. The resultant looped cords 31, 31' are entrained about balancing pulleys 34, 35.

Each of the parachute sections B, C and D is provided with similar pairs of looped balancing cords 36, 36'; 37, 37' and 38, 38', secured at spaced points on side edges 12A, 12B; 13A, 13B and 14A, 14B respectively of said sections, B, C and D, as shown in FIG. 1. The balancing cords 36, 36'; 37, 37' and 38, 38' are entrained about pulleys 39, 40; 41, 42 and 43, 44 respectively.

Adjacent balancing pulleys, as pulley 34 of section A and pulley 42 of section C are disposed on a common shaft 45 on bracket 46. Bracket 46 is connected to base member 23 by a line 47A of fixed length. It will be apparent, that in any tilted position of parachute section A, the side edges 11A, 11B thereof will be maintained in an extended relation.

Adjacent pairs of balancing pulleys 35, 44; 40, 43; and 39, 41 are mounted on brackets similar to bracket 46, which brackets are located at a fixed distance from base member 23 by lines 47B, 47C and 47D. The action of such balancing cords is illustrated in FIGS. 4–8 where the parachute section A is shown moving between its completely open and its completely closed positions.

On base member 23 there is provided electronic gear for controlling the motors 30A, 30B, 30C and 30D in the form of a radio signal responsive control mechanism, generally indicated at 50. Such mechanism of known construction is adapted to receive control signals from a transmitter, not shown, for starting, stopping and reversing the several motors, singly and in combination as desired.

The parachute 10 may be manipulated in a variety of patterns, depending on the objective. Thus, parachute 10 may be steered in a desired direction; may be slowed down in its movements, and may be regulated to tilt its sections to their open and closed positions. Also, the parachute sections may be adjusted to provide specific relationships thereof in accordance with the prevailing air currents.

Motors 30A and 30B may be operated in response to the proper signal transmitted to receiver 50, so as to rotate both motors in the same direction and thereby tilt parachute sections A and B simultaneously from a given position; in which case, as apex 19 of section A is pulled down and base 15 thereof rises; apex 20 of section B rises and base 16 thereof is pulled down. Of course, on reversing motors 30A, 30B, such movements of sections A and B may be reversed. Parachute sections C and D may be similarly manipulated by controlled operation of their motors 30C and 30D.

Figure 4:
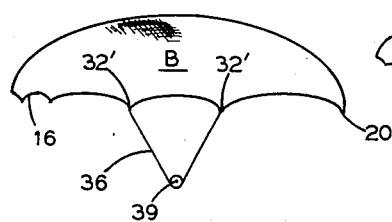
FIG. 4 is a side elevational view of a single parachute section in its fully open position.
Figure 5:
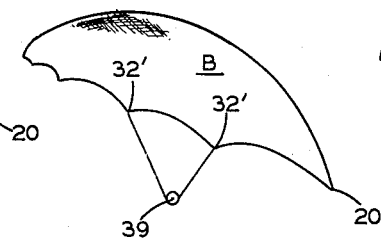
FIGS. 5, 6 and 7 are views similar to that of FIG. 4, showing said parachute section in progressively closing positions.
Figure 6:
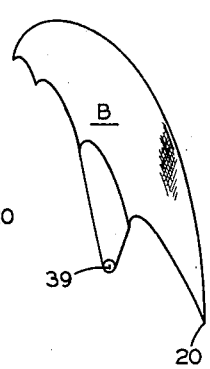
Figure 7:
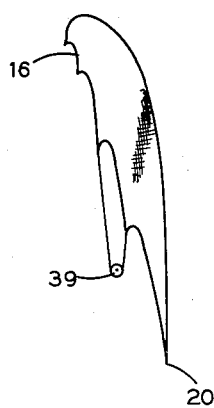
Figure 8:
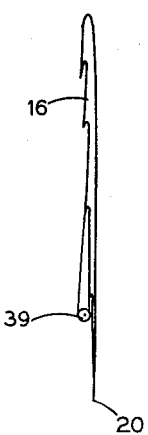
FIG. 8 is a side elevational view of the parachute section shown in FIG. 4, in its fully closed position.
Figure 11:
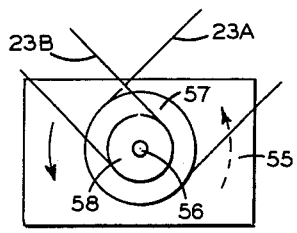
FIG. 11 is a side elevational view showing a single motor for tilting a pair of opposed parachute sections.

Also, as shown in FIGS. 4 to 8, any one of the parachute sections A–D may be tilted from a fully open position, as shown in FIG. 4 to a fully closed position, upon rotation of motor 30A in the proper direction, as shown in FIG. 8. It will be apparent that the arrangement of sections A–D and their independent or correlated manipulation through the corresponding operation of their respective motors 30A–30D, provides for various patterns of operation for parachute 10 to suit any given situation, in terms of release of the parachute from its carrier to its deposit on a selected point on the ground.

A single section of parachute 10 or one or more sets of coupled sections thereof, fitted on planes, may also be used as means for controlled braking of such planes as they approach their landing spot; particularly, in the case of planes landing on a carrier within a limited landing area.

It will also be apparent that while any of sections A–D is being tilted between fully open and fully closed positions, the side edges of said sections will be maintained in distended position by the action of the balancing cords 31, 31'; 36, 36'; 37, 37', etc. shifting about their respective pulleys 34, 35; 39, 40, etc. Such balancing pulleys 34, 35, etc. are at fixed distances relative to base member 23 by reason of lines 47A, 47B, etc., extending from the brackets 46, etc., to base member 23. Accordingly, the change in position of the tilted sections A–D, as illustrated in FIGS. 4–8 will result in compensated and uniform tension on the side edges of the tilted parachute section.

If desired, a single motor 55, may be used to handle the looped shroud lines of a pair of oppositely disposed parachute panel sections, as A, B; in which case the shaft 56 thereof carries double pulleys 57, 58, which respectively engage the looped shroud lines 23A, 23B of said sections A, B. It will be apparent that with rotation of shaft 56 in one direction, apex 19 of section A will rise while apex 20 of section B will lower, and simultaneously base 15 of section A will lower while base 16 of section B will rise. Rotation of shaft 56 in the opposite direction will reverse these effects.

As various changes might be made in the embodiments of the invention herein disclosed, without departing from the spirit thereof, it is understood that all matter herein shown or described, shall be deemed illustrative and not limiting, except as set forth in the appended claims.

What is claimed is:

1. A parachute construction comprising a plurality of quadrant shaped parachute panel sections with their respective apices in adjacent relationship, a base member, line means extending from said sections to suspend said base member from said sections, said line means comprising looped line members interconnecting the apex of a parachute section at one end thereof and peripheral base portions of said section at the other ends thereof, means on said base member engageable with said looped line members for moving said looped line members in a given direction to raise or lower the apex of said section while the base portion thereof is simultaneously lowered or raised.

2. A parachute construction comprising a set of four quadrant shaped parachute panel sections having their respective apices in adjacent central location and opposed side edges thereof in adjacent relationship, a base member, a set of four pulleys on said base member, means for rotating each pulley in opposite directions, shroud line means for each parachute panel section comprising a single cord extending from the apex of said section and a plurality of cords extending from spaced points along the base of said section, said single cord and said plurality of cords being interconnected to form a single loop, said loop being entrained about a single pulley associated with said panel section, whereby rotation of said pulley in one direction is effective to lower the apex of said panel section while the base thereof is raised, and rotation of said pulley in the opposite direction is effective to raise the apex of said panel section while the base thereof is lowered.

3. A parachute construction as in claim 2 and including means for maintaining the side edges of each parachute section in extended form while the apex and base thereof are being lowered and raised, said means comprising a pair of depending, looped balancing cords having the opposite ends thereof secured to spaced points along each side edge of a section, a pair of balancing pulleys, said looped balancing cords being respectively entrained about said balancing pulleys, and lines means of fixed length extending from said base to said balancing pulleys to maintain said balancing pulleys at a fixed distance from said base.

4. A parachute construction as in claim 3 and further including common shaft means for each pair of balancing pulleys respectively associated with adjacent panel parachute sections on opposed sides thereof.

5. A parachute construction comprising a plurality of quadrant shaped parachute panel sections, a base member, looped tilting line means connecting inner and outer peripheral portions of each panel section, means on said base member engageable with bight portions of the respective looped line means associated with the respective panel sections for moving said looped line means in a desired direction to regulate the angular tilted position of each panel section relative to said base means.

6. A parachute construction comprising four quadrant shaped panel sections having their respective apices in central adjacent relationship, a base member, a set of four pulleys on said base member, means for rotating each pulley in opposite directions, shroud line means extending from each panel section to an associated pulley, each shroud line means comprising a single cord extending from the apex of the associated panel section and a plurality of cords extending from spaced points on the arcuate base of said panel section, said single cord and said plurality of cords being interconnected in a loop form entrained about said associated pulley, and signal responsive means on said base member for controlling the rotation of selected pulley rotating means.

7. A parachute construction as in claim 6 and further including a depending balancing cord loop on each side of each panel section, each balancing cord loop being secured at the opposite ends thereof to spaced points along a side of a panel section between the apex and one end of the base thereof, a balancing pulley engaging the looped bight portion of each balancing cord loop, pulley bracket means, said balancing pulley being rotatably mounted on said bracket means, line means of fixed length connecting said bracket means and said base member.

8. A parachute construction comprising four quadrant shaped parachute panel sections having their respective apices in centrally adjacent relationship, a base member, shroud lines for suspending said base member from said parachute sections, said shroud lines means comprising looped line means for each parachute section, said looped line means comprising a single cord portion extending from the apex of the parachute section associated therewith and a multicord portion extending from spaced points on the base of said parachute section, rotatable means on said base member engageable with the bight portion of said looped line means for shifting said single cord and multicord portions in a given direction to tilt the associated parachute section in a given direction.

9. A parachute as in claim 8 wherein said rotatable means comprises a reversible motor operated pulley for each parachute section.

10. A parachute as in claim 8 wherein said rotatable means comprises a pair of reversible motors, a pair of pulleys on the shaft of each motor, the bight portions of the looped line means of each pair of opposed parachute sections being entrained about the pair of pulleys respectively on said pair of motors respectively.

11. A parachute construction comprising a plurality of independent parachute sections, each parachute section comprising inner and outer peripheral portions, the parachute sections being arranged to locate the respective inner portions adjacent each other, looped suspension means for each section, one end of each suspension means being connected to the inner portion of the associated parachute section and the other end of said suspension means being connected to the outer portion of the associated parachute section, a base member suspended from the bight portions of said looped suspension, means, and means on said base member for pulling said looped suspension means to move the inner and outer portions of said parachute section in opposite directions whereby to independently tilt the respective parachute sections with respect to the vertical.

12. A parachute comprising a plurality of independently movable parachute sections, said parachute sections having first peripheral portions located adjacent each other, each parachute section having second peripheral portions forming the outer periphery of said parachute, looped suspension means for each parachute section with the opposite ends thereof connected to first and second peripheral portions respectively thereof, a base member suspended from said suspension means, and means on said base member for moving the opposite end portions of each looped suspension means simultaneouly in opposite directions whereby each parachute section is independently tilted with the first and second peripheral portions thereof simultaneously moving vertically in opposite directions.

13. A parachute comprising a plurality of independently movable parachute sections, each parachute section comprising an apex portion and an outer peripheral portion, said sections being arranged with their apex portions adjacent each other and forming the central portion of said parachute while the outer peripheral portions of said sections form the outer periphery of said parachute, said parachute in its closed condition having the adjacent apex portions thereof disposed in a lower most position and the outer peripheral portions in an uppermost position, and looped suspension means on each parachute section with the opposite ends thereof secured to the apex and outer peripheral portions respectively thereof said looped suspension means being adapted to be manpiulated to bring the apex portions of said paracuhte sections to a position raised in relation to the initial lowermost position thereof and said outer peripheral portions to a position depressed in relation to the initial uppermost position thereof whereby to move said parachute sections to their open condition.

References Cited in the file of this patent
FOREIGN PATENTS

| | | |
|---|---|---|
| 226,851 | Great Britain | Dec. 30, 1924 |
| 1,121,072 | France | Apr. 30, 1956 |
| 1,202,409 | France | July 20, 1959 |